US012569974B2

(12) United States Patent
Huang

(10) Patent No.: US 12,569,974 B2
(45) Date of Patent: Mar. 10, 2026

(54) POWER TOOL

(71) Applicant: MOBILETRON ELECTRONICS CO., LTD., Taichung City (TW)

(72) Inventor: Jui-Chen Huang, Taichung City (TW)

(73) Assignee: MOBILETRON ELECTRONICS CO., LTD., Taichung City (TW)

(*) Notice: Subject to any disclaimer, the term of this patent is extended or adjusted under 35 U.S.C. 154(b) by 0 days.

(21) Appl. No.: 18/813,040

(22) Filed: Aug. 23, 2024

(65) Prior Publication Data

US 2025/0083294 A1 Mar. 13, 2025

(30) Foreign Application Priority Data

Sep. 7, 2023 (TW) ................................ 112209650

(51) Int. Cl.
*B25F 5/00* (2006.01)
*B25F 5/02* (2006.01)

(52) U.S. Cl.
CPC ................ *B25F 5/001* (2013.01); *B25F 5/02* (2013.01)

(58) Field of Classification Search
CPC .................................. B25F 5/001; B25F 5/02
See application file for complete search history.

(56) References Cited

U.S. PATENT DOCUMENTS

| | | | | |
|---|---|---|---|---|
| 2016/0354914 | A1* | 12/2016 | Bartoszek | B25F 5/001 |
| 2019/0217460 | A1* | 7/2019 | Mahalingappa | B25F 5/02 |
| 2021/0122017 | A1* | 4/2021 | Kelly | H05B 47/16 |

* cited by examiner

*Primary Examiner* — Michelle Lopez
(74) *Attorney, Agent, or Firm* — Apex Juris, pllc; R. Lynette Wylie

(57) ABSTRACT

A power tool includes a body with a main casing and a handle connected to the main casing. The main casing has a head and a tail arranged along a second direction in sequence and located along an axis. A side of the tail facing the second direction has an end wall and a mounting wall closer to a handle than the end wall. A straight line that passes through the most protruding part of the handle and a surface of the end wall and intersects the axis is defined as a collision boundary line. The mounting wall is located on a side of the collision boundary line facing a first direction. The first direction is opposite to the second direction. A setting module is disposed in the tail. A panel of the setting module is exposed outward on the mounting wall.

7 Claims, 9 Drawing Sheets

POWER TOOL

BACKGROUND OF THE INVENTION

Technical Field

The present invention relates generally to a power tool, and more particularly to a power tool with a setting module disposed at a position that is unlikely subjected to collisions, thereby preventing the setting module from damage due to collisions.

Description of Related Art

A conventional power tool, such as an electric wrench, an electric screwdriver, an electric drill, and an electric nail gun, is a portable tool that is powered by a motor. It is required to set an operational mode of the power tool, including changing a rotation direction of the power tool or adjusting a rotation speed and a torque of the power tool. In recent years, power tools in the market are generally equipped with a setting device on a body, so that a user could set the operational mode of the power tool.

However, when the power tool is not in use, the power tool is casually placed at a working area nearby. Other hard objects are present in the working region, so that the power tool is easily subjected to collisions due to falling or dropping and collisions with the other objects while a user moves the other objects or moves the power tool. The setting module is delicate and is typically disposed at a position where a surface is protruding and is likely subjected to collisions. As a result, the setting module of the power tool is easily damaged due to collisions and hence fails to provide the function of setting the operational mode of the power tool.

BRIEF SUMMARY OF THE INVENTION

In view of the above, the primary objective of the present invention is to provide a power tool, wherein a setting module is disposed at a position of the power tool where the setting module is unlikely subjected to collisions with other objects, so that the setting module could be prevented from being damaged due to collisions and a user could conveniently set an operational mode of the power tool through the setting module.

The present invention provides a power tool including a body, a motor, a reducing gear set, an output shaft, a control circuit, and a setting module. The body includes a main casing and a handle connected to a side of a periphery of the main casing. The main casing has a head a tail located on an axis in sequence. Two opposite directions along the axis are respectively defined as a first direction and a second direction. The head is located on a side of the tail facing the first direction. Another side of the tail facing the second direction has an end wall and a mounting wall. The mounting wall is closer to the handle than the end wall.

The handle includes a handle casing and a battery module. An end of the handle casing has an end portion adapted to connect to the main casing. Another end of the handle casing away from the end portion has an engaging portion. The battery module is detachably engaged with the engaging portion. A straight line that passes through the most protruding part of the handle along the second direction and a surface of the end wall and intersects the axis is defined as a collision boundary line. The mounting wall is located on a side of the collision boundary line facing the first direction.

The motor, the reducing gear set, and the output shaft are disposed in the main casing with the axis as a rotation center and are connected in sequence along the direction. The output shaft has a driving head protruding out of the head. The control circuit is disposed in the body and is respectively and electrically connected to the motor and the battery module. The control circuit is adapted to control an operation of the motor. The setting module is disposed in the tail and is electrically connected to the control circuit. The setting module has a panel exposed outward on the mounting wall.

The mounting wall is located on the side of the collision boundary line facing the first direction and the panel of the setting module is exposed outward on the mounting wall, so that the setting module of the present invention is protected by the handle and the end wall of the tail. Compared to the handle and the end wall that are more protruding in the second direction, the mounting wall on where the setting module is disposed is less likely subjected to collisions with a foreign object, so that the setting module could be prevented from being damaged due to collisions with the foreign object. Moreover, the mounting wall is located on the side of the tail of the body facing the second direction to be easily viewed and touched by a user when the user holds the handle, so that exposing the panel of the setting module outward on the mounting wall could allow the user to conveniently set the power tool through the panel.

Preferably, the most protruding part of the handle along the second direction is the battery module.

Preferably, a surface of the mounting wall has an opening; the panel is exposed outward on the mounting wall through the opening; a surface of the panel is aligned with a peripheral edge of the opening; alternatively, the panel is disposed on an inside of the opening; in this way, the opportunity that the panel is subjected to collisions with the foreign object is reduced. Preferably, the panel of the setting module has a button; the button is adapted to trigger the control circuit to select different operational modes to control an operation of the power tool; additionally, the panel of the setting module has a setting region; the setting region has at least one LED light; the at least one LED light is adapted to show a current operational mode of the power tool when the button triggers the control circuit to select the different operational modes to control the operation of the power tool.

Preferably, the opening has a top edge and a bottom edge; the top edge is closer to the axis than the bottom edge and the bottom edge is farther from the axis than the top edge; the top edge and the bottom edge are parallel; a tilted line, which is virtual, intersects the axis and passes through a middle point of the top edge and a middle point of the bottom edge; a tilted angle provided between the tilted line and the axis is less than 90 degrees; preferably, the tilted angle ranges between 45 degrees and 90 degrees; most preferably, the tilted angle ranges between 65 degrees and 75 degrees.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
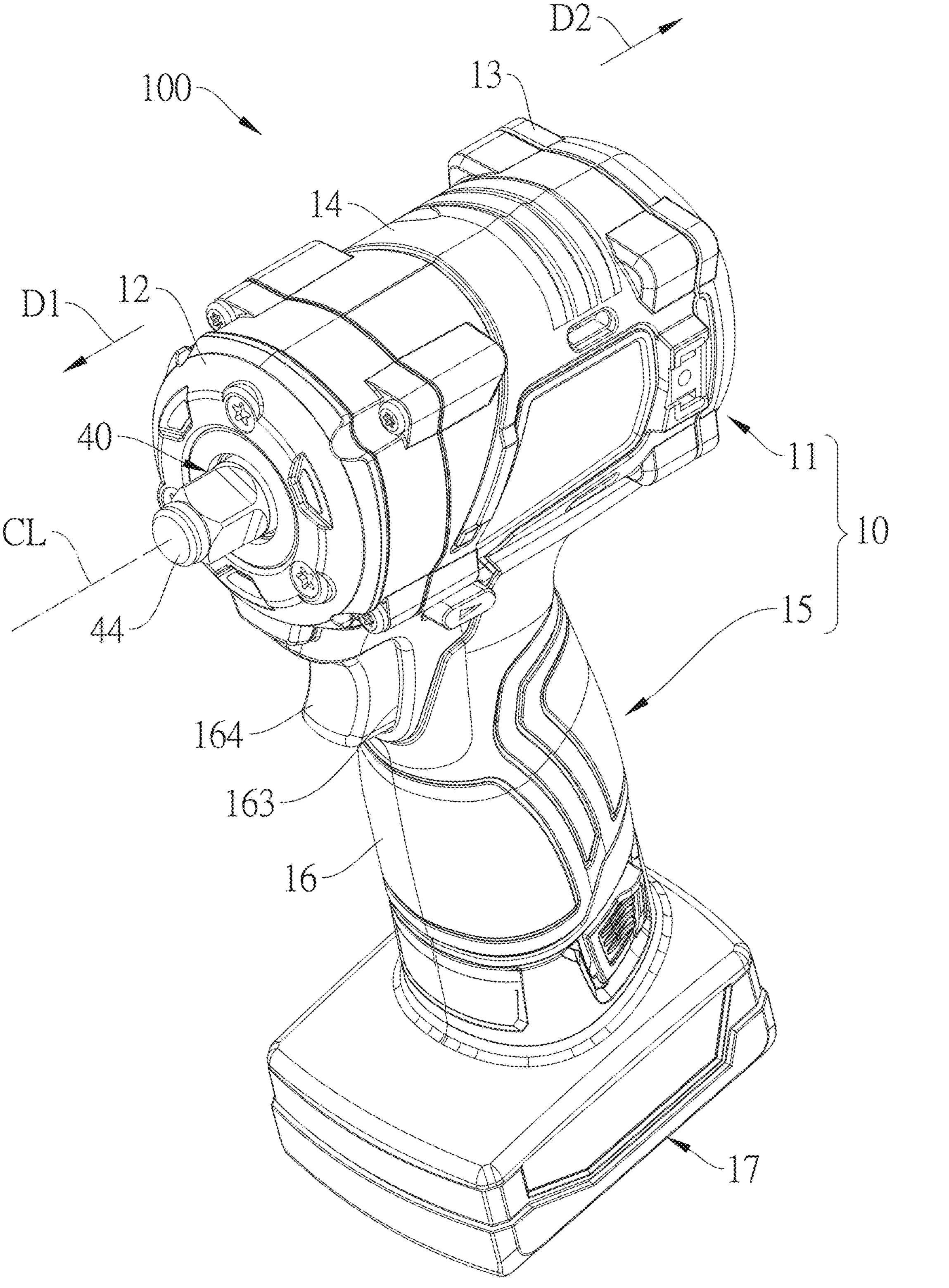
FIG. 1 is a perspective view of the power tool according to a first embodiment of the present invention.
Figure 2:
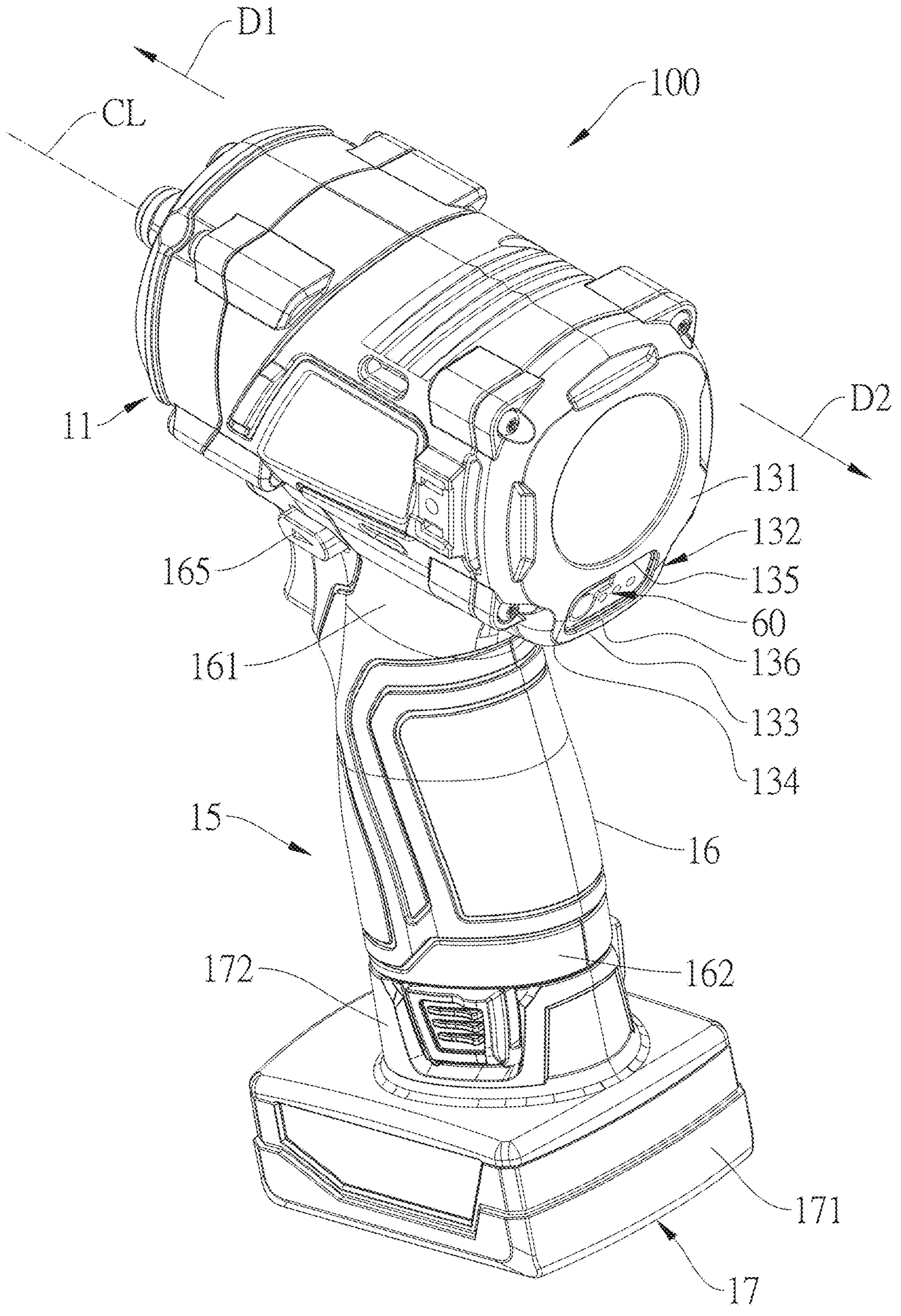
FIG. 2 is a perspective view of the power tool according to the first embodiment of the present invention seen from another direction.
Figure 3:
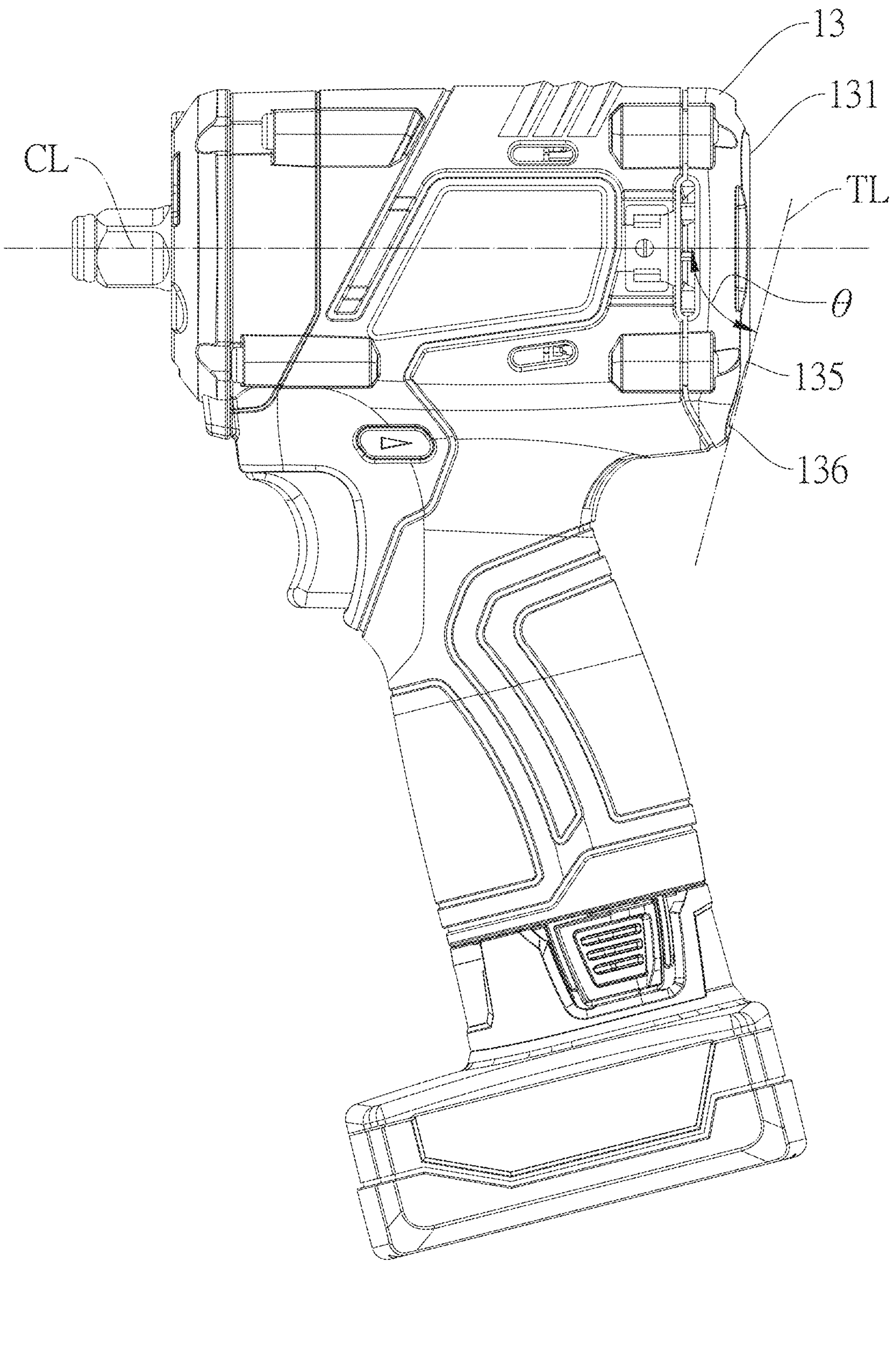
FIG. 3 is a side view of the power tool according to the first embodiment of the present invention.
Figure 4:
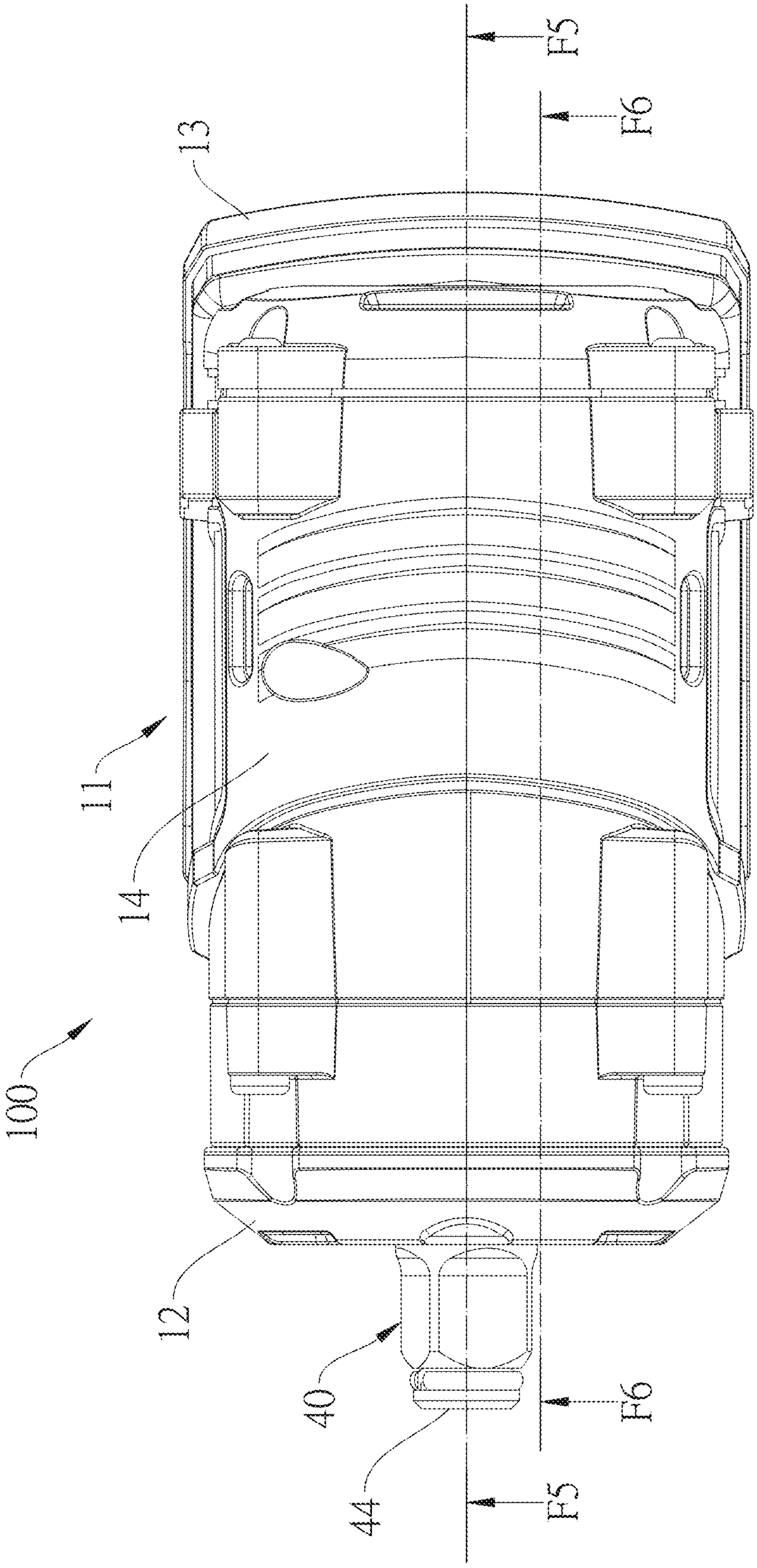
FIG. 4 is a top view of the power tool according to the first embodiment of the present invention.

A power tool 100 according to a first embodiment of the present invention is illustrated in FIG. 1 to FIG. 5 and FIG. 7. The power tool 100 is an electric wrench and is adapted to fasten a bolt to an object or remove a bolt from an object. The power tool 100 includes a body 10, a motor 20, a reducing gear set 30, an output shaft 40, a control circuit 50, and a setting module 60.

The body 10 includes a main casing 11 and a handle 15 connected to a side of a periphery of the main casing 11. The main casing 11 has a head 12 and a tail 13 that are located along an axis CL in sequence, wherein the axis CL is virtual. A middle section 14 is connected between the head 12 and the tail 13. Two opposite directions along the axis CL are respectively defined as a first direction D1 and a second direction D2. The head 12 is connected to a side of the middle section 14 facing the first direction D1. The tail 13 is connected to another side of the middle section 14 facing the second direction D2. The head 12 is located on a side of the tail 13 facing the first direction D1.

Referring to FIG. 1 to FIG. 3 and FIG. 5, the side of the tail 13 facing the first direction D1 has an end wall 131 and a mounting wall 132. In the current embodiment, the end wall 131 is substantially perpendicular to the axis CL; the end wall 131 protrudes further in the second direction D2 than the mounting wall 132; the mounting wall 132 is closer to the handle 15 than the end wall 131. The mounting wall 132 has a surface 133. The surface 133 has an opening 134. The opening 134 has a top edge 135 and a bottom edge 136, wherein the top edge 135 is closer to the axis CL than the bottom edge 136 and the bottom edge 136 is farther from the axis CL than the top edge 135. The top edge 135 and the bottom edge 136 are parallel. A tilted line TL, which is virtual, intersects the axis CL and passes through a middle point of the top edge 135 and a middle point of the bottom edge 136. A tilted angle θ provided between the tilted line TL and the axis CL is less than 90 degrees, so that the surface 133 of the mounting wall 132 more oblique than the end wall 131. Preferably, the tilted angle θ ranges between 45 degrees and 90 degrees. Most preferably, the tilted angle θ ranges between 65 degrees and 75 degrees. In this way, the surface 133 of the mounting wall 132 and the opening 134 substantially orientate along a line of sight of a user when the use holds the handle 15, bringing convenience in viewing and touching the mounting wall 132.

The handle 15 includes a handle casing 16 and a battery module 17. An end of the handle casing 16 has an end portion 161 adapted to connect to a side of a periphery of the main casing 11. A side of the end portion 161 facing the first direction D1 has a trigger opening 163. A trigger 164 is disposed in the end portion 161, wherein a part of the trigger 164 passes out of the trigger opening 163. A direction button 165 passes through a part of the end portion 161 adjacent to the main casing 11. The direction button 165 could switch among three positions, namely an intermediate position, a forward rotation position, and a reverse rotation position that is opposite to the forward rotation position. The handle casing 16 is connected to the tail 13 and the middle section 14 of the main casing 11 through the end portion 161, thereby forming a casing including the tail 13, the middle section 14, and the handle casing 16. Another end of the handle casing 16 away from the end portion 161 has an engaging portion 162 and is adapted to detachably engage with the battery module 17. In the current embodiment, the battery module 17 has a battery casing 171, wherein a side of the battery casing 171 facing the handle casing 16 has an engaging cylinder 172, and an insertion portion 173 is disposed in the engaging cylinder 172. When the battery module 17 is detachably engaged with the handle casing 16, the insertion portion 173 is inserted into the handle casing 16, the engaging cylinder 172 abuts against a free end of the handle casing 16, and the engaging cylinder 172 is stuck at the engaging portion 162.

Figure 5:
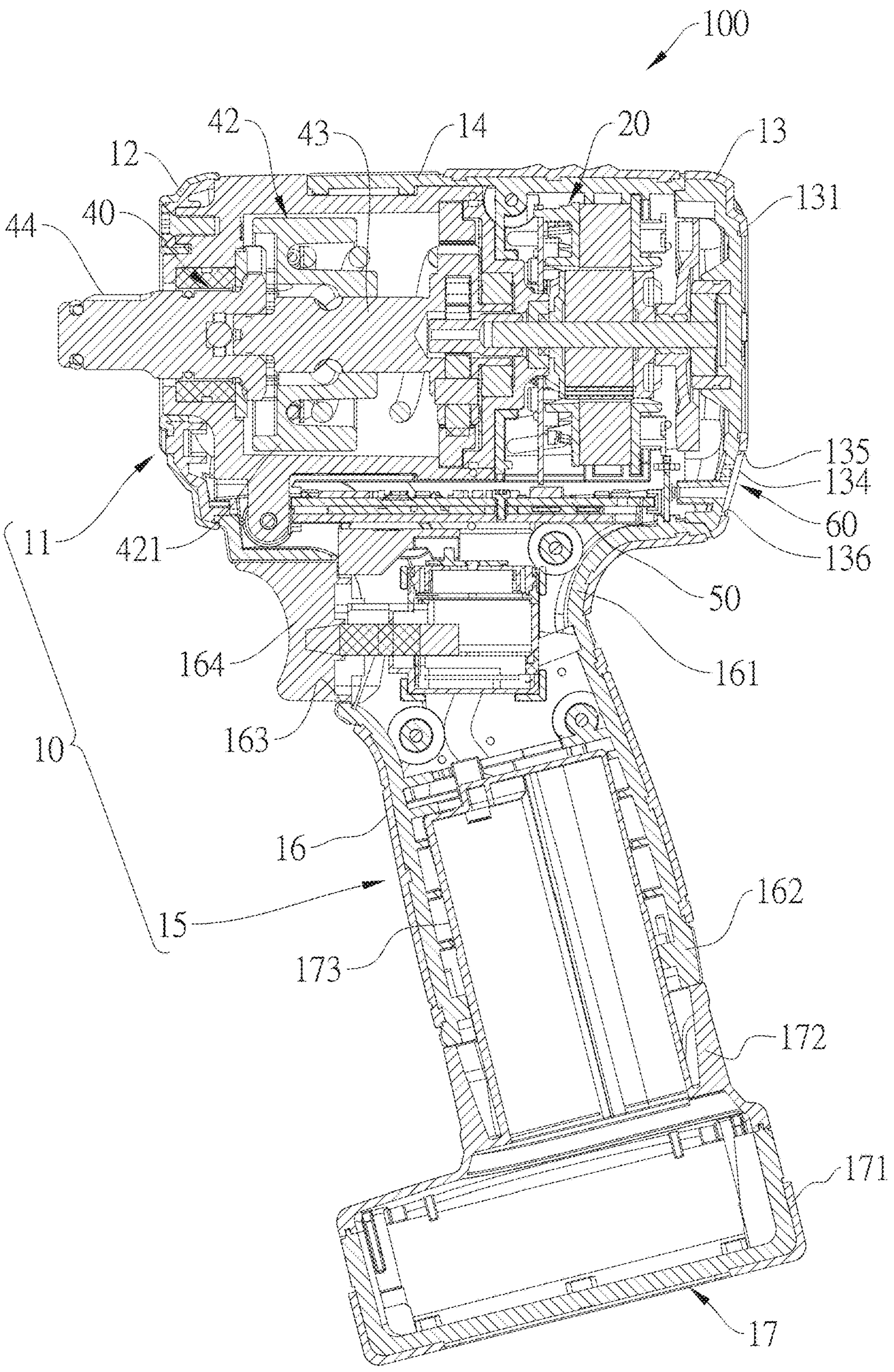
FIG. 5 is a sectional view along the F5-F5 line in FIG. 4.
Figure 6:
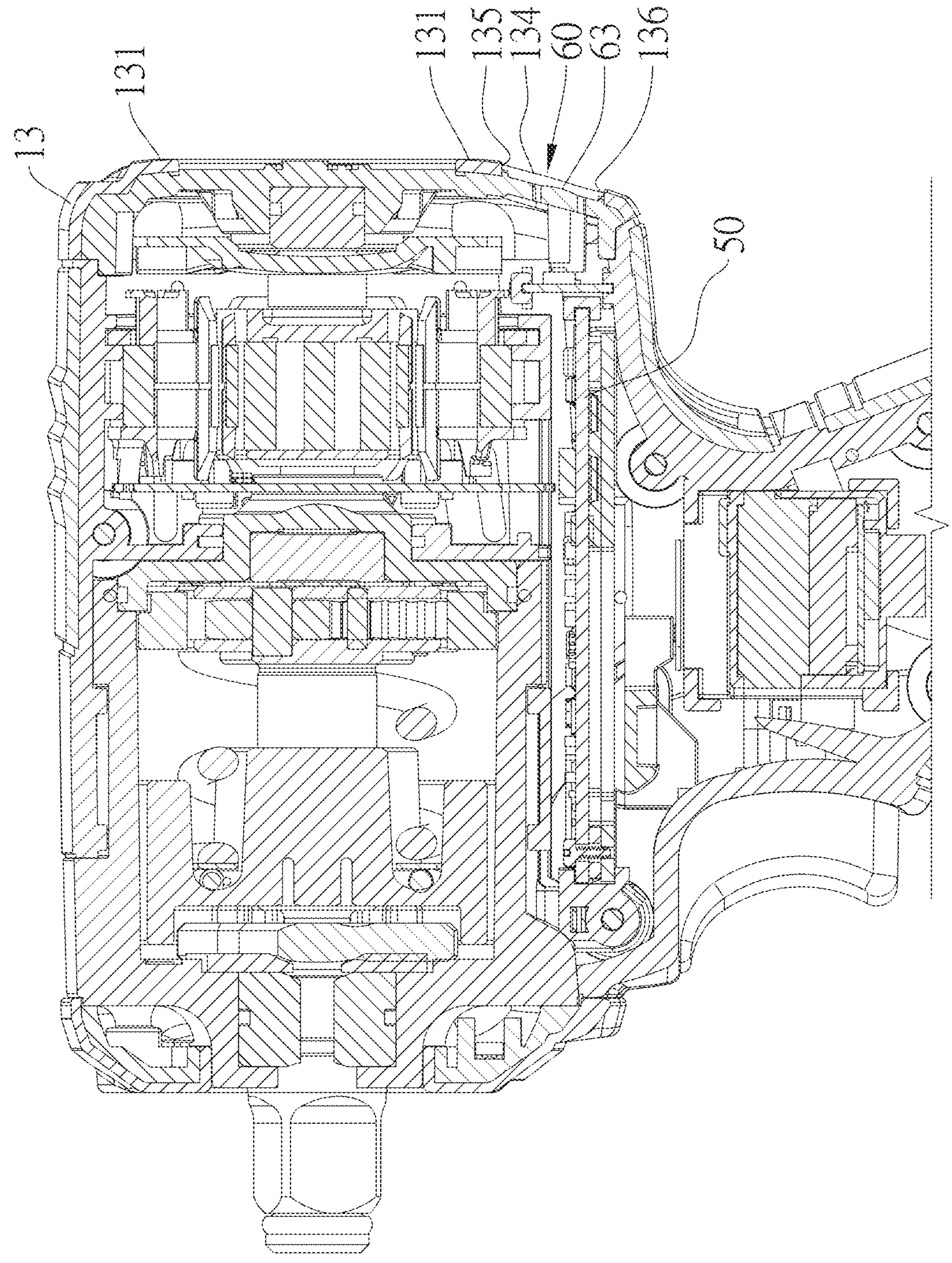
FIG. 6 is a sectional view along the F6-F6 line in FIG. 4.
Figure 7:
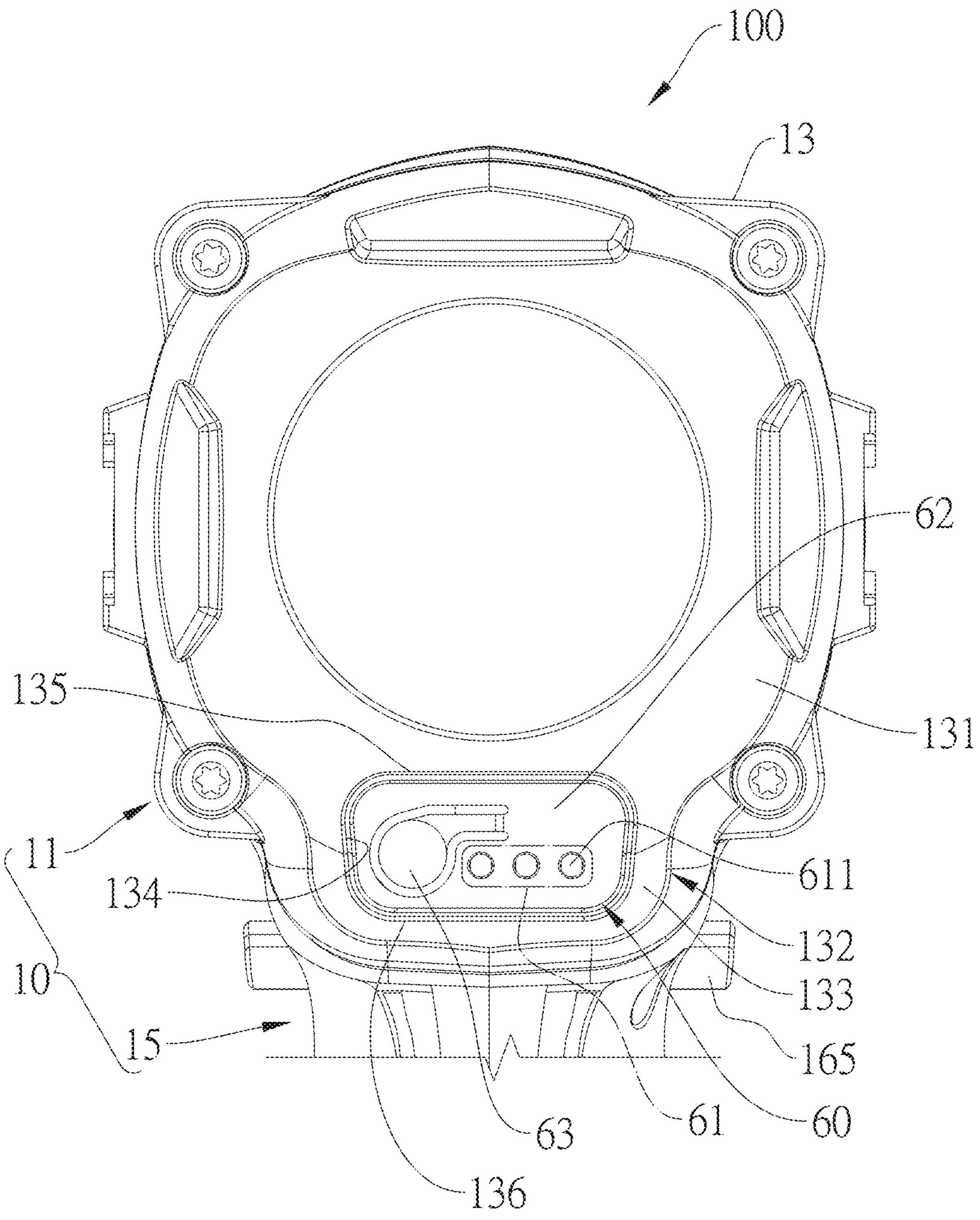
FIG. 7 is a rear view of FIG. 1, showing a part of the power tool.
Figure 8:
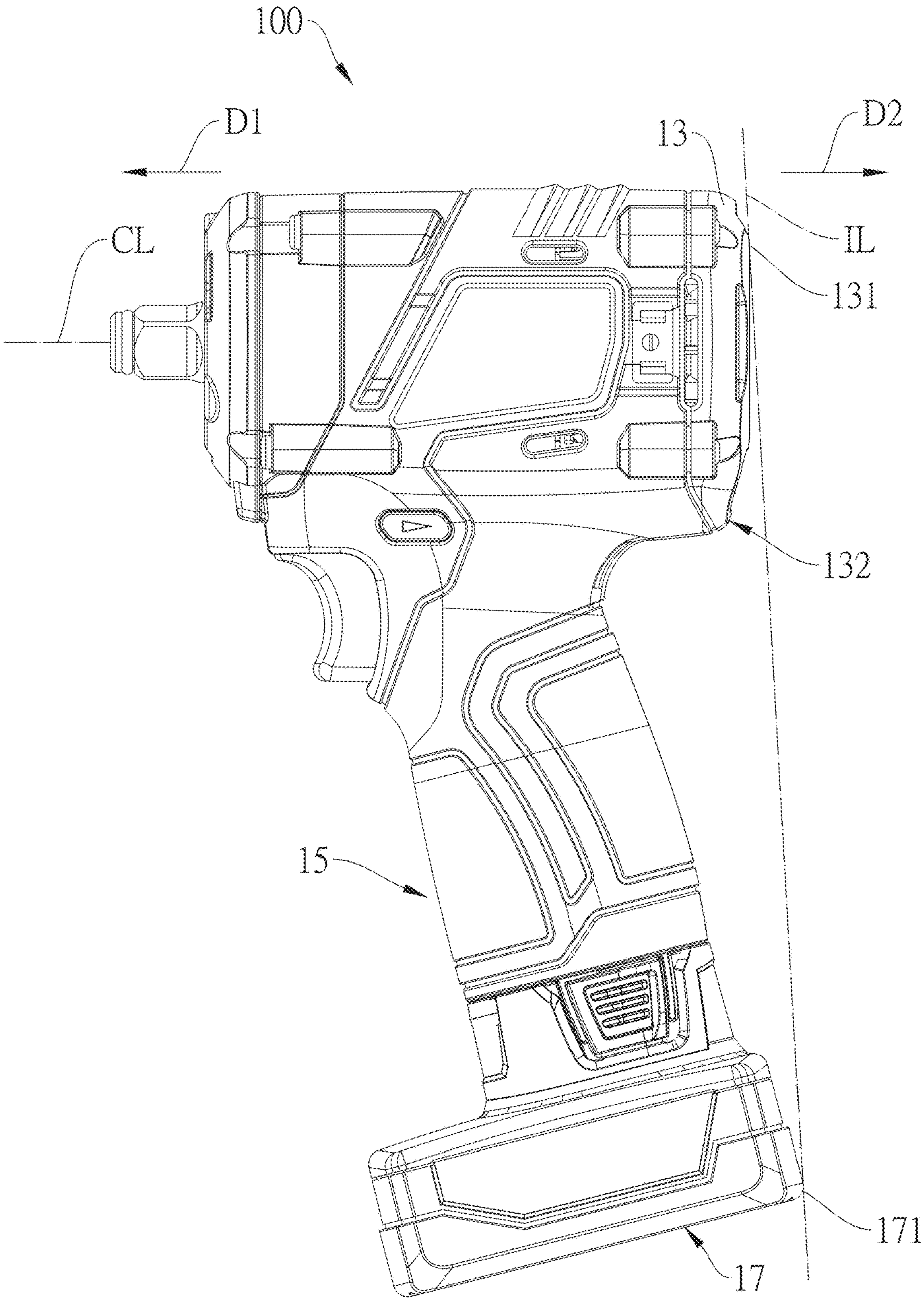
FIG. 8 is a schematic view showing the relative position of the mounting wall and the collision boundary line in FIG. 4.

Referring to FIG. 5, FIG. 7, and FIG. 8, a straight line that passes through the most protruding part of the handle 15 along the second direction D2 and a surface of the end wall 131 and intersects the axis CL is defined as a collision boundary line IL. In the current embodiment, the most protruding part of the handle 15 along the second direction D2 is the most protruding part of the battery casing 171 of the battery module 17 along the second direction D2. In the current embodiment, the mounting wall 132 is located on a side of the collision boundary line IL facing the first direction D1. In this way, when the power tool 100 is subjected to a collision coming from the second direction D2 or when a side of the power tool 100 facing the second direction D2 falls onto a ground, the handle 15, which is more protruding along the second direction D2, of the power tool 100, especially the battery module 17 and the end wall 131 of the tail 13, is subjected to an impact first, so that the mounting wall 132 is protected and an opportunity that the mounting wall 132 is impacted by an foreign object is reduced. Moreover, compared to the end wall 131 which faces the second direction D2, the surface 133 of the mounting wall 132 is more oblique, so that an area of the surface 133 directly facing the second direction D2 is reduced, thereby further reducing the opportunity that the surface 133 is directly impacted by the foreign object.

Referring to FIG. 5 to FIG. 8, the motor 20, the reducing gear set 30, and the output shaft 40 takes the axis CL as a rotation center and are connected in sequence along the first direction D1. In the current embodiment, the reducing gear set 30 is a planetary gear set and is connected between the motor 20 and the output shaft 40; the reducing gear set 30 is adapted to reduce a rotation output of the motor 20 and transmit the rotation output of the motor 20 to the output shaft 40. An impact device 42 is disposed on an inside of the main casing 11 adjacent to the head 12 and has an impact drill 421 fitting around the output shaft 40. When the power tool 100 is used to fasten or loosen a bolt and is subjected to a certain degree of resistance, the impact drill 421 of the impact device 42 exerts an intermittent impact force on the output shaft 40 in a direction the same as a rotation direction of the output shaft 40, thereby providing an intermittent assistant torque to the output shaft 40 to overcome the resistance. More specifically, the output shaft 40 has a shaft body 43 and a driving head 44 connected to the shaft body 43. The impact drill 421 fits around the shaft body 43. The driving head 44 protrudes out of the head 12 and is adapted to engage with a bolt sleeve.

The control circuit 50 is disposed in the body 10. In the current embodiment, the control circuit 50 is disposed on an inside of the main casing 11 adjacent to the handle casing 16. The control circuit 50 is respectively and electrically connected to the motor 20, the trigger 164, the direction button 165, and the battery module 17. The battery module 17 powers the power tool 100 through the control circuit 50. The control circuit 50 is triggered by a signal of the trigger 164 to control the motor 20 to operate. When the direction button 165 is switched to the forward rotation position, the control circuit 50 controls the motor 20 to operate forwardly. When the direction button 165 is switched to the reverse rotation position, the control circuit 50 controls the motor 20 to operate reversely. The control circuit 50 could receive a signal from the setting module 60 to select different rotation speeds and torques to control the motor 20 to drive the output shaft 40, so that the power tool 100 operates at different operational modes with the different rotation speeds and torques. The setting module 60 is disposed in the tail 13 and has a panel 62 exposed outward on the mounting wall 132. In the current embodiment, the panel 62 is located on an inside of the opening 134 and is exposed outward through the opening 134 of the mounting wall 132. The setting module 60 is electrically connected to the control circuit 50. Through performing setting by using the panel 62, the control circuit 50 selects the different rotation speeds and torques to control the motor 20 to drive the output shaft 40, so that the power tool 100 could operate in the different operational modes with the different rotation speeds and torques.

The setting module 60 is disposed on the tail 13. The panel 62 is exposed outward on the mounting wall 132 through the opening 134. The mounting wall 132 is located on the side of the collision boundary line IL facing the first direction D1. In this way, the setting module 60 is protected by the handle 15, especially the battery module 17 and the end wall 131 of the tail 13. As the opportunity that the mounting wall 132 is impacted by the foreign object is low, the setting module 60 is unlikely collided with the foreign object to be damaged. Moreover, as the panel 62 is exposed outward through the opening 134, the panel 62 orientates in a direction the same as the line of sight of the user, so that the user could conveniently select the operational mode of the power tool 100. Additionally, as the panel 62 is disposed on the inside of the opening 134, the panel 62 of the setting module 60 could be prevented from being collided and damaged by the foreign object.

In the current embodiment, the setting module 60 has a setting region 61 on the panel 62; the setting region 61 has a plurality of LED lights 611. More specifically, the setting region 61 has three LED lights 611. A button 63 is provided on a part of the panel 62 other than the setting region 61. The button 63 includes a micro switch and is electrically connected to the control circuit 50. The button 63 is adapted to trigger the control circuit 50 to select different operational modes to control an operation of the power tool 100. The control circuit 50 is electrically connected to the LED lights 611.

Referring to FIG. 5 and FIG. 7, in the current embodiment, when the direction button 165 is switched to the intermediate position, pressing the trigger 164 could cause the LED lights 611 to indicate at least three battery levels (at least including a low level, a medium level, and a high level) by the number of the LED lights 611 that are illuminated. When the direction button 165 is switched to the forward rotation position, pressing the button 63 could trigger the control circuit 50 to control the motor 20; when the user presses the trigger 164, the motor 20 is controlled to rotate the output shaft 40 at different rotation speeds and torques. In the current embodiment, the control circuit 50 could control the motor 20 to output the torque in four levels ranging from low to high. When the button 63 is pressed, the torque and the rotation speed are switched in a cycling manner through a first level, a second level, a third level, and a fourth level. When the control circuit 50 controls the motor 20 to drive the output shaft 40 at a particular level of the torque and the rotation speed and makes the power tool 100 operate at the particular level of the torque and the rotation speed, a current rotation speed and a current torque of the power tool 100 are indicated by the three LED lights 611, wherein only the first LED light 611, only the second LED light 611, only the third LED light 611, and all of the three LED lights 611 illuminate to represent the first level, the second level, the third level, and the fourth level of the current rotation speed and the current torque of the power tool 100 at a current operational mode, respectively. In other words, the current rotation speed and the current torque of the power tool 100 are indicated by the LED lights 611. In other embodiments, the current rotation speed and the current torque could be indicated by the number of the LED lights 611 illuminating.

In other embodiments, the setting region 61 of the panel 62 could be provided with only one LED light. 611; at that time, the color of light of the LED light 611, such as red, orange (or yellow), and green, represents a high level, a medium level, a low level, of the current rotation speed and the current torque or represents a low level, a medium level, or a high level of a current battery level. In other embodiments, the LED light or the plurality of LED lights could be replaced with a seven-segment display or a plurality of seven-segment displays; the seven-segment display could show the level of the rotation speed, the level of the torque, and the level the battery level on the setting region 61 (for example, the numerical digits 0-9 shown on the seven-segment display represent the level of the rotation speed, the level of the torque, and the level of the battery level; alternatively, the plurality of seven-segment displays show an exact value of the rotation speed, an exact value of the torque, and an exact value of the battery level.

Alternatively, when the plurality of LED lights 611 of the panel 62 are replaced with a liquid crystal panel, the liquid crystal panel could show, in the numerical digits, a value of the current rotation speed and a value of the current torque at which the control circuit 50 controls motor 20 to drive the output shaft 40 or the liquid crystal panel could show the current battery level as a low level, a medium level, or a high level or in percentage for the user to view. In the first embodiment of the present invention, the setting module 60 triggers the control circuit 50 to select the operational mode of the power tool 100 for adjusting the rotation speed and the torque of the power tool 100 to different levels. In other embodiments, the operational mode could also include other parameters of the power tool 100. For example, the setting module 60 could replace the direction button 165 for controlling the motor 20 to rotate the output shaft 40 forwardly and reversely.

Figure 9:
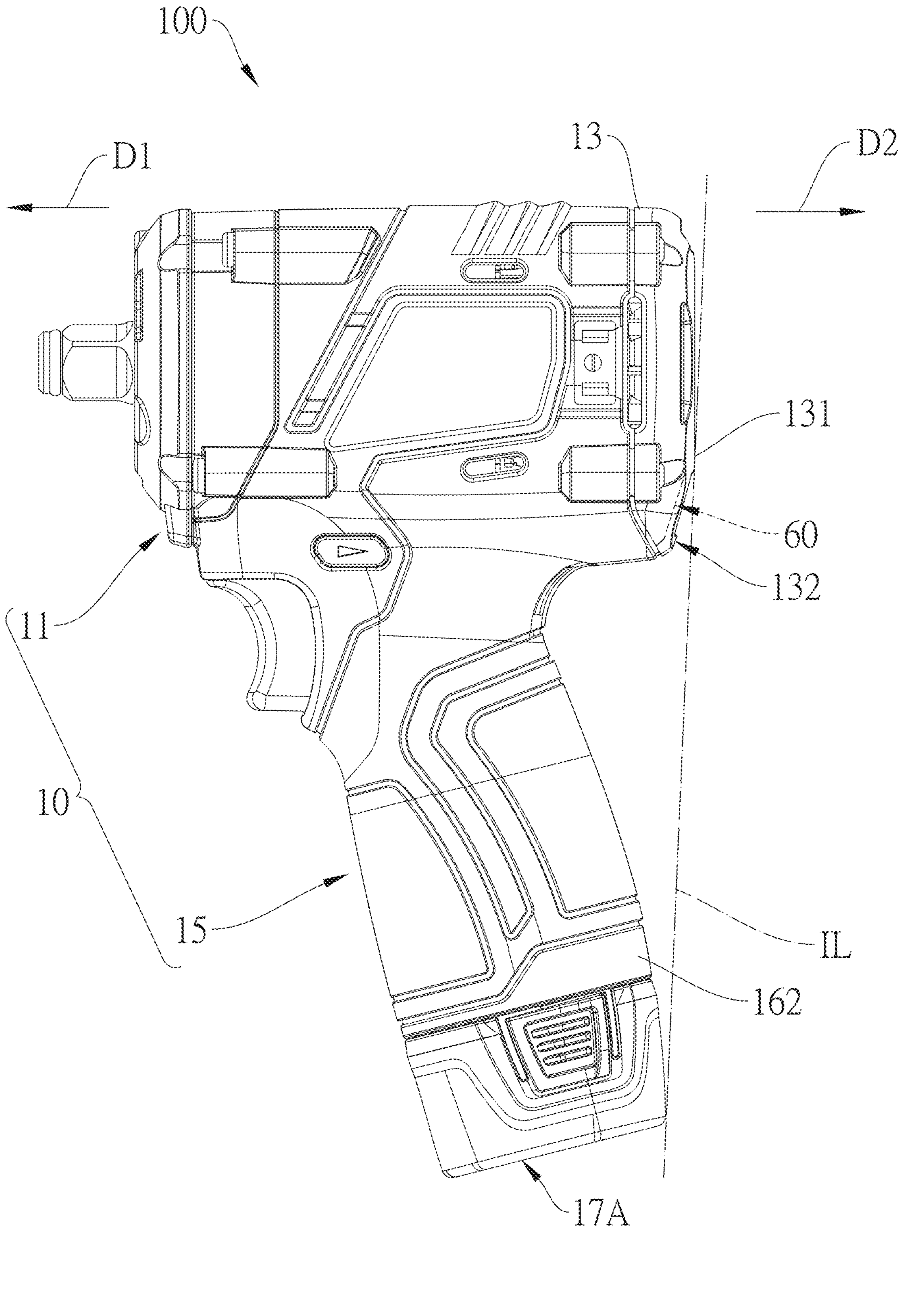
FIG. 9 is a side view of the power tool according to a second embodiment of the present invention.

A second embodiment of the present invention is illustrated in FIG. 9. The difference between the first embodiment and the second embodiment is that in the second embodiment, the engaging portion 162 of the body 10 is engaged with a battery module 17A which is different from the batter module 17 of the first embodiment. The battery module 17A of the second embodiment is still the most protruding part of the handle 15 along the second direction D2. A straight line that passes through the most protruding part of the handle 15 along the second direction D2 and the surface of the end wall 131 and intersects the axis CL is defined as a collision boundary line IL. The mounting wall 132 is still located on a side of the collision boundary line IL facing the first direction D1. In this way, the setting module 60 of the second embodiment is protected by the handle 15 and the end wall 131 of the tail 13, so that the opportunity of being collided by the foreign object is low, thereby preventing the setting module 60 from being damaged by collisions with the foreign object.

In the first embodiment and the second embodiment of the present invention, the panel 62 of the setting module 60 is disposed within the opening 134 of the mounting wall 132. In other embodiments, a surface of the panel 62 could be aligned with a peripheral edge of the opening 134. At that time, the panel 62 of the setting module 60 remains on the side of the collision boundary line IL facing the first direction D1 and hence is protected by the handle 15 and the end wall 131 of the tail 13.

It must be pointed out that the embodiments described above are only some preferred embodiments of the present invention. All equivalent structures which employ the concepts disclosed in this specification and the appended claims should fall within the scope of the present invention.

What is claimed is:

1. A power tool, comprising a body, a motor, a reducing gear set, an output shaft, a control circuit, and a setting module;

wherein the body comprises a main casing and a handle connected to a side of a periphery of the main casing; the main casing has a head and a tail that are located along an axis in sequence; two opposite directions along the axis are respectively defined as a first direction and a second direction; the head is located on a side of the tail facing the first direction; another side of the tail facing the second direction has an end wall and a mounting wall; the mounting wall is closer to the handle than the end wall;

wherein the handle comprises a handle casing and a battery module; an end of the handle casing has an end portion adapted to connect to the main casing; another end of the handle casing away from the end portion has an engaging portion; the battery module is detachably engaged with the engaging portion; a straight line that passes through the most protruding part of the handle along the second direction and a surface of the end wall and intersects the axis is defined as a collision boundary line; the mounting wall is located on a side of the collision boundary line facing the first direction;

wherein the motor, the reducing gear set, and the output shaft are disposed in the main casing with the axis as a rotation center and are connected in sequence along the first direction; the output shaft has a driving head protruding out of the head; the control circuit is disposed in the body and is respectively and electrically connected to the motor and the battery module; the control circuit is adapted to control an operation of the motor; the setting module is disposed in the tail and is electrically connected to the control circuit; the setting module has a panel exposed outward on the mounting wall;

wherein the mounting wall has a surface; the surface of the mounting wall has an opening; the panel is exposed outward on the mounting wall through the opening;

wherein the opening has a top edge and a bottom edge; the top edge is closer to the axis than the bottom edge and the bottom edge is farther from the axis than the top edge; the top edge and the bottom edge are parallel; a tilted line, which is virtual, intersects the axis and passes through a middle point of the top edge and a middle point of the bottom edge; a tilted angle provided between the tilted line and the axis is less than 90 degrees.

2. The power tool as claimed in claim 1, wherein the most protruding part of the handle along the second direction is the battery module.

3. The power tool as claimed in claim 1, wherein the tilted angle ranges between 45 degrees and 90 degrees.

4. The power tool as claimed in claim 3, wherein the tilted angle ranges between 65 degrees and 75 degrees.

5. The power tool as claimed in claim 1, wherein the panel is disposed on an inside of the opening.

6. The power tool as claimed in claim 5, wherein the panel of the setting module has a button; the button is adapted to trigger the control circuit to select different operational modes to control an operation of the power tool.

7. The power tool as claimed in claim 6, wherein the panel of the setting module has a setting region; the setting region has at least one LED light; the at least one LED light is adapted to show a current operational mode of the power tool when the button triggers the control circuit to select the different operational modes to control the operation of the power tool.

* * * * *